(12) United States Patent
Tsujimoto

(10) Patent No.: US 7,789,570 B2
(45) Date of Patent: Sep. 7, 2010

(54) TAPERED ROLLER BEARING

(75) Inventor: Takashi Tsujimoto, Iwata (JP)

(73) Assignee: NTN Corporation, Osaka-Fu (JP)

( * ) Notice: Subject to any disclaimer, the term of this patent is extended or adjusted under 35 U.S.C. 154(b) by 525 days.

(21) Appl. No.: 10/581,338

(22) PCT Filed: Nov. 30, 2004

(86) PCT No.: PCT/JP2004/018113

§ 371 (c)(1),
(2), (4) Date: Mar. 23, 2007

(87) PCT Pub. No.: WO2005/054697

PCT Pub. Date: Jun. 16, 2005

(65) Prior Publication Data

US 2007/0280574 A1    Dec. 6, 2007

(30) Foreign Application Priority Data

Dec. 2, 2003    (JP) .............................. 2003-403438
Jul. 5, 2004    (JP) .............................. 2004-198708

(51) Int. Cl.
*F16C 33/48* (2006.01)
(52) U.S. Cl. .................. 384/572; 384/470; 384/580
(58) Field of Classification Search ................ 384/572, 384/580, 581, 576
See application file for complete search history.

(56) References Cited

U.S. PATENT DOCUMENTS

| | | | | |
|---|---|---|---|---|
| 1,426,578 A | * | 8/1922 | Lott | ............................. 384/577 |
| 5,352,047 A | * | 10/1994 | Ingall et al. | .................. 384/572 |
| 5,590,225 A | | 12/1996 | Aramaki et al. | |
| 5,617,937 A | * | 4/1997 | Zettner et al. | .................. 192/45 |
| 5,964,536 A | * | 10/1999 | Kinoshita | .................... 384/441 |
| 6,086,261 A | | 7/2000 | Nakagawa et al. | |
| 6,206,575 B1 | * | 3/2001 | Matsushita et al. | ........... 384/523 |
| 6,213,648 B1 | * | 4/2001 | Weidinger | ................... 384/575 |
| 6,857,785 B2 | * | 2/2005 | Takahashi et al. | ............ 384/572 |

FOREIGN PATENT DOCUMENTS

| | | |
|---|---|---|
| JP | 64-79419 | 3/1989 |
| JP | 11-210765 | 8/1999 |
| JP | 2000-240661 | 9/2000 |
| JP | 2002-195255 | 7/2002 |
| JP | 2002276672 A * | 9/2002 |
| JP | 2003-28165 | 1/2003 |
| JP | 2003-166543 | 6/2003 |
| JP | 2003-314542 | 11/2003 |

\* cited by examiner

*Primary Examiner*—Richard W L Ridley
*Assistant Examiner*—Alan B Waits
(74) *Attorney, Agent, or Firm*—Wenderoth, Lind & Ponack, L.L.P.

(57) ABSTRACT

A tapered roller bearing has an increased load capacity and has a decreased maximum face pressure on the raceway surfaces without lowering the rigidity of the cage. The tapered roller bearing includes an inner ring, an outer ring, multiple tapered rollers rollably disposed between the inner ring 2 and the outer ring 3, and a cage for holding the tapered rollers at predetermined circumferential intervals, wherein the roller coefficient γ thereof is larger than 0.94. Herein, γ=(the number of the rollers×the average diameter of the rollers)/(π× PCD).

6 Claims, 5 Drawing Sheets

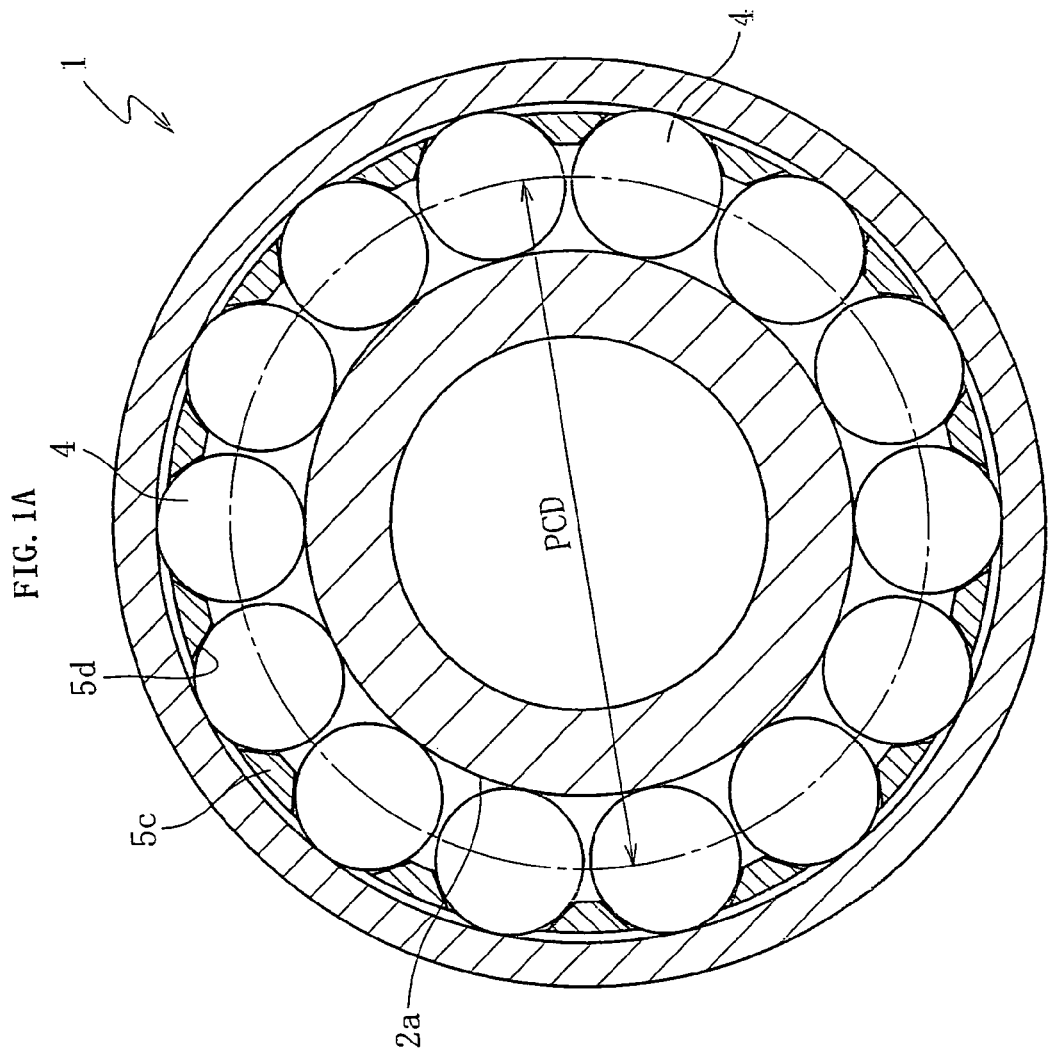
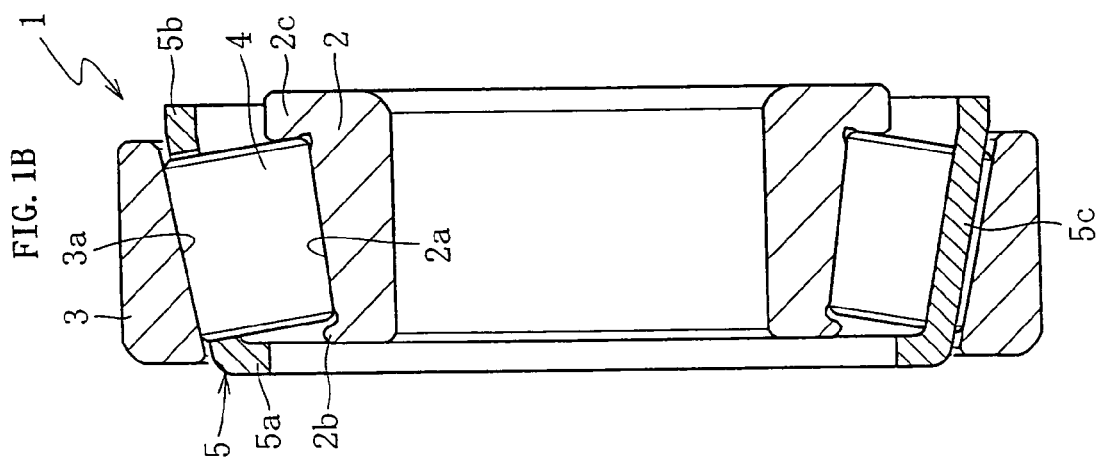

FIG. 4

| Bearing | Roller coefficient | Lifetime | Remarks |
|---|---|---|---|
| Comparative example 1 (Conventional bearing with cage made of steel plate) | 0.86 | 16.4 hours | Flaking was observed on the inner ring. |
| Embodiment 1 (Bearing with cage made of steel plate) | 0.96 | 40.2 hours | Stoppage occurred due to increased torque caused by abrasion at th cage. |
| Embodiment 2 | 0.96 | 200 hours or more | No abnormality was observed, and the test was terminated. |

FIG. 5

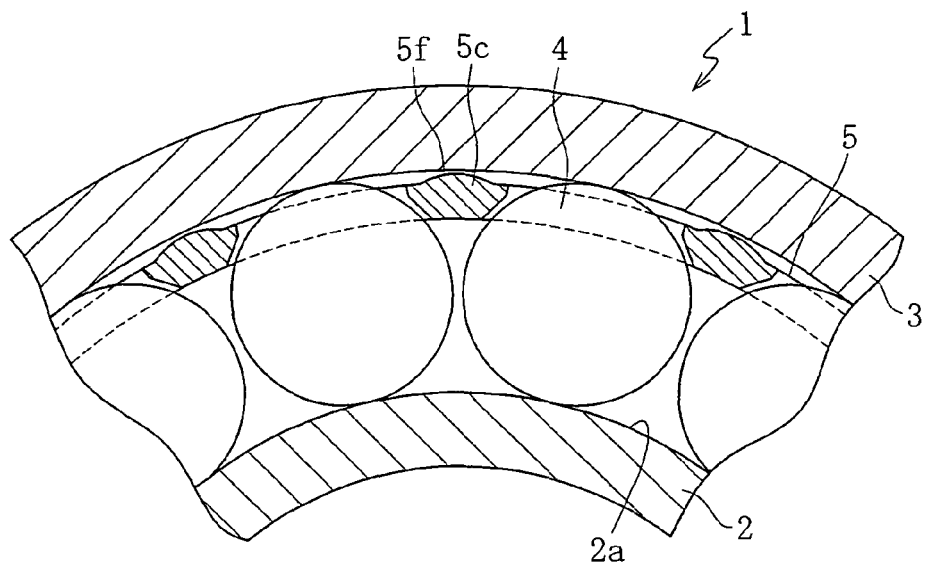

FIG. 6

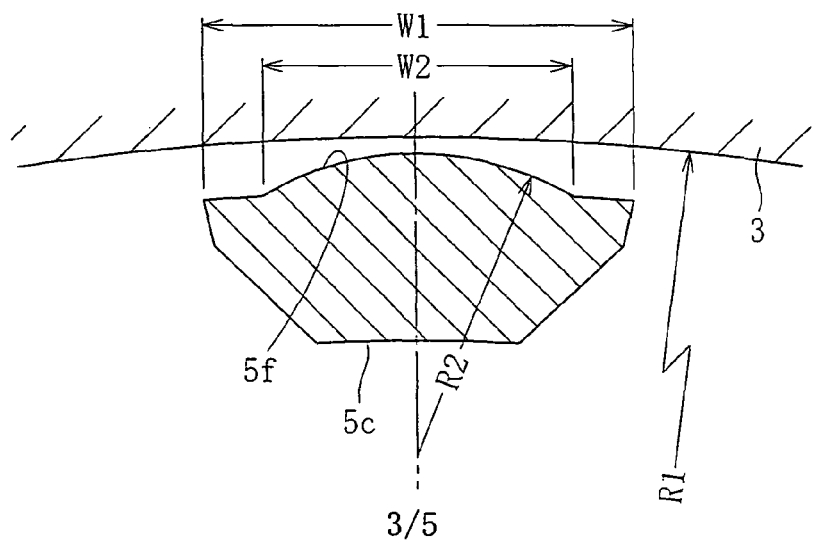

TAPERED ROLLER BEARING

BACKGROUND OF THE INVENTION

1. Field of the Invention

The present invention relates to a tapered roller bearing, and more particularly, to a tapered roller bearing suitably incorporated into the gear device of an automobile transmission.

2. Description of the Related Art

Automobile transmissions are broadly classified into a manual type and an automatic type. Furthermore, they can also be classified according to the driving system of a vehicle into a trans-axle for front wheel drive (FWD), a transmission for rear wheel drive (RWD), and a transfer for four-wheel drive (4WD). These are used to speed-change the drive power delivered from the engine and to transmit it to the drive shaft or the like.

FIG. 7 shows a configuration example of an automobile transmission. This transmission is a synchronous meshing type, in which the left side in the figure is the engine side and the right side is the drive wheel side. A tapered roller bearing 43 is disposed between a main shaft 41 and a main drive gear 42. In this example, the outer ring raceway surface of the tapered roller bearing 43 is directly formed on the inner circumference of the main drive gear 42. The main drive gear 42 is supported using a tapered roller bearing 44 so as to be rotatable with respect to a casing 45. A clutch gear 46 is engaged with and connected to the main drive gear 42, and a synchro-mechanism 47 is disposed adjacent the clutch gear 46.

The synchro-mechanism 47 comprises a sleeve 48 that is moved axially (in the left-right direction in the figure) by the action of a selector (not shown), a synchronizer key 49 installed in the inner circumference of the sleeve 48 so as to be movable in the axial direction, a hub 50 engaged with and connected to the outer circumference of the main shaft 41, a synchronizer ring 51 slidably mounted on the outer circumference (the cone section) of the clutch gear 46, and a urging pin 52 and a spring 53 for elastically pressing the synchronizer key 49 against the inner circumference of the sleeve 48.

In the state shown in the figure, the sleeve 48 and the synchronizer key 49 are held at the neutral position using the urging pin 52. At this time, the main drive gear 42 rotates idle with respect to the main shaft 41. On the other hand, when the sleeve 48 is moved, for example, to the left in the axial direction, from the state shown in the figure by the operation of the selector, the synchronizer key 49 is moved to the left in the axial direction, following the sleeve 48, whereby the synchronizer ring 51 is pressed against the inclined surface of the cone section of the clutch gear 46. This decreases the rotation speed of the clutch gear 46 and increases the rotation speed of the synchro-mechanism 47. Furthermore, at the time when the rotation speeds of the two have become synchronized, the sleeve 48 is further moved to the left in the axial direction, meshing with the clutch gear 46. Hence, the main shaft 41 and the main drive gear 42 are connected to each other via the synchro-mechanism 47. As a result, the main shaft 41 and the main drive gear 42 are rotated synchronously.

In recent years, low-viscosity oil tends to be used for automobile transmissions to meet the needs for automatic transmission (AT), continuously variable transmission (CVT), low fuel consumption, etc. In an environment where low-viscosity oil is used, surface-originated flaking, which causes a very short life, sometimes occurs in the inner ring raceway surface having high surface pressure due to improper lubrication when such adverse conditions as (1) high oil temperature, (2) low amount of oil and (3) loss of pressurization occur simultaneously.

A direct and effective solution to the problem of the short life due to the surface-originated flaking is to reduce the maximum surface pressure. For the purpose of reducing the maximum surface pressure, it is necessary to change the bearing size or to increase the number of the rollers or the bearing if the bearing size is not to be changed. For the purpose or increasing the number of the rollers without decreasing the roller diameter, it is necessary to narrow the distance between the pockets in the cage. However, for this purpose, the pitch circle of the cage must be increased so that the cage is shifted so as to be as close as possible to the outer ring.

As an example in which the cage is shifted so as to make contact with the inner diameter surface of the outer ring, there is a tapered roller bearing shown in FIG. 8 (refer to Japanese Patent Laid-Open No. 2003-28165). In this tapered roller bearing 61, the outer circumferential surface of the small diameter annular section 62a and the outer circumferential surface of the large diameter annular section 62b of the cage 62 are disposed in slide contact with the inner diameter surface of the outer ring 63 so as to guide the cage 62. Furthermore, a recess 64 for suppressing drag torque is formed on the outer diameter surface of the pole section 62c of the cage 62, thereby maintaining the non-contact state between the outer diameter surface of the pole section 62c and the raceway surface 63a of the outer ring 63. The cage 62 has the small diameter annular section 62a, the large diameter annular section 62b, and the multiple pole sections 62c that connect the small diameter annular section 62a to the large diameter annular section 62b in the axial direction and are formed with the recess 64 on the outer diameter surface thereof. Furthermore, multiple pockets, in each so which a tapered roller 65 is rollably accommodated, are provided so that each pocket is disposed between two pole sections 62c. The small diameter annular section 62a is provided with a flange section 62d integrally extending to the inner diameter side. The tapered roller bearing shown in FIG. 8 is an example intended to improve the strength of the cage 62, wherein the cage 62 is shifted so as to make contact with the inner diameter surface of the outer ring 63 in order to increase the circumferential width of the pole section 62c of the cage 62.

In the tapered roller bearing 61 described in Japanese Patent Laid-Open No. 2003-28165, the cage 62 is shifted to the outer diameter side so as to make contact with the inner diameter surface of the outer ring 63 in order to increase the circumferential width of the pole section 62c of the cage 62. Furthermore, because the recess 64 is provided in the pole section 62c of the cage 62, the plate thickness of the pole section 62c becomes inevitably thin, and the rigidity of the cage 62 is reduced. Hence, the cage 62 may be deformed due to stress during the assembly of the bearing 61 or may also be deformed during the rotation of the bearing 61.

On the other hand, a conventional typical tapered roller bearing with a cage, other than the tapered roller bearing described in Japanese Patent Laid-Open No. 2003-28165, is designed so that the roller coefficient γ (roller filling factor) defined by the following formula is usually 0.94 or less in order to securely obtain the pole width of the cage 72 and obtain appropriate strength of the pole of the cage 72 and smooth rotation while avoiding contact between the outer ring 71 and the cage 72 as shown in FIG. 9.

Roller coefficient $\gamma = (Z \cdot DA)/(\pi \cdot PCD)$ where Z is the number of the rollers, DA is the average diameter of the rollers, and PCD is the pitch circle diameter of the cage.

In addition, in FIG. 9, numeral 73 denotes the tapered roller, numeral 74 denotes the surface of the pole, numeral 75 denotes the inner ring, and e denotes a window angle.

SUMMARY OF THE INVENTION

The present invention is intended to increase the load capacity of a tapered roller bearing and to prevent premature breakage due to excessive pressure on the raceway surfaces thereof.

The tapered roller bearing according to the first aspect of the invention comprises an inner ring, an outer ring, multiple tapered rollers rollably disposed between the inner and outer rings, and a cage for holding the tapered rollers at predetermined circumferential intervals, wherein the roller coefficient γ thereof is larger than 0.94.

The second aspect of the invention is characterized in that the window angle of the pocket of the tapered roller bearing according to the first aspect of the invention is in the range of 55° to 80°. The window angle is the angle formed by the guide surfaces of the pole sections making contact with the circumferential surface of each roller. The reason for setting the minimum value of the window angle at 55° is to secure a proper state of contact with the roller. In addition, the reason for setting the maximum value at 80° is that if the angle is larger than this value, the radial pressing force increases, causing a danger that smooth rotation cannot be obtained even if the cage is made of a self-lubricating resin material. In the case of ordinary cages, the window angle thereof is in the range of 25° to 50°.

The third aspect of the invention is characterized in that the cage of the tapered roller bearing according to the first or second aspect of the invention is formed of an engineering plastic superior in mechanical strength, oil resistance, and heat resistance. In comparison with a cage formed of a steel plate, the cage formed of a resin material is light-weight, self-lubricating, and low in friction coefficient. These features, together with the effect of the lubricating oil present in the bearing, make it possible to suppress occurrence of abrasion due to contact with the outer ring.

In comparison with a steel plate, such a resin is light in weight and low in friction coefficient, thereby being suitable for reducing torque loss and cage abrasion at the time of starting the rotation of the bearing.

Engineering plastics include general-purpose engineering plastics and super engineering plastics. Typical ones are given below. However, they are examples of engineering plastics, and engineering plastics are not limited to those described below.

[General-purpose engineering plastics] polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), ultra-high molecular weight polyethylene (UHMW-PE)

[Super engineering plastics] polysulfone (PSF), polyethersulfone (PES), polyphenylene sulfide (PPS), polyarylate (PAR), polyamideimide (PAI), polyetherimide (PEI), (polyetheretherketone (PEEK), liquid crystal polymer (LCP), thermoplastic polyimide (TPI), polybenzimidazole (PBI), polymethylpentene (TPX), poly 1,4-cyclohexane dimethylene terephthalate (PCT), polyamide 46 (PA46), polyamide 6T (PA6T), polyamide 9T (PA9T), polyamide 11, 12 (PA11, 12), fluororesin, polyphthalamide (PPA)

Because the roller coefficient γ of the tapered roller bearing is set so as to be greater than 0.94, not only the load capacity increases but also the maximum surface pressure on the raceway surfaces can be reduced. Therefore, it is possible to prevent surface-originated flaking, which causes a very short life, under severe lubrication conditions.

BRIEF DESCRIPTION OF THE DRAWINGS

The above and other objects and advantages of the invention will be more apparent from the following description and drawings, in which:

FIG. 1A is a cross-sectional view showing a tapered roller bearing according to the present invention, and FIG. 1B is a vertical-sectional view showing the bearing;

FIG. 4 is table showing the results of bearing life tests.

FIG. 5 is a partially sectional view showing a tapered roller bearing according to a modified embodiment of the present invention;

FIG. 6 is a sectional view showing a pole section or the cage shown in FIG. 5;

DESCRIPTION OF THE PREFERRED EMBODIMENTS

Figure 2:
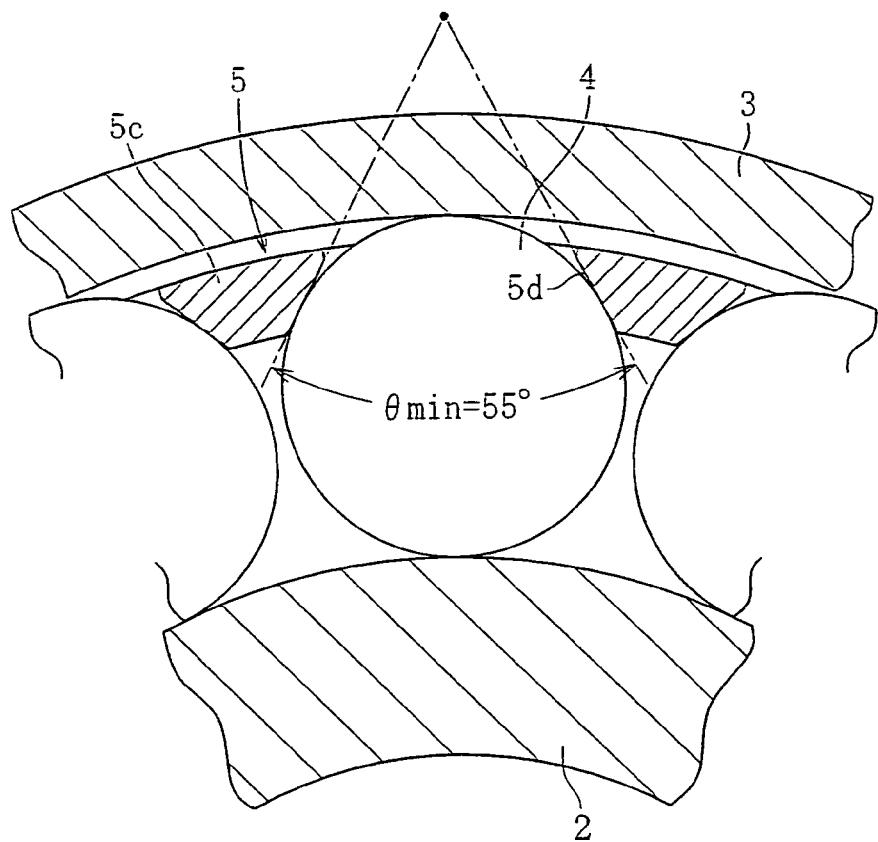
FIG. 2 is a partially enlarged sectional view showing the tapered roller bearing having a minimum window angle.

An embodiment according to the present invention will be described hereinafter referring to FIGS. 1 to 4. A tapered roller bearing 1 according to the embodiment, shown in FIGS. 1A and 1B, has a tapered raceway surface 2a, and comprises an inner ring 2 having a small flange section 2b on the small diameter side and a large flange section 2c on the large diameter side of the raceway surface 2a, an outer ring 3 having a tapered raceway surface 3a, multiple tapered rollers 4 rollably disposed between the raceway surface 2a of the inner ring 2 and the raceway surface 3a of the outer ring 3, and a cage 5 for holding the tapered rollers 4 equal circumferential intervals. The roller coefficient γ of the taper-roller bearing 1 is herein greater than 0.94.

The cage 5, integrally molded of a super engineering plastic, such as PPS, PEEK, PA, PPA or PAI, comprises a small diameter side annular section 5a, a large diameter side annular section 5b, and multiple pole sections 5c that make axial connection between the small diameter side annular section 5a and the large diameter side annular section 5b.

Figure 3:
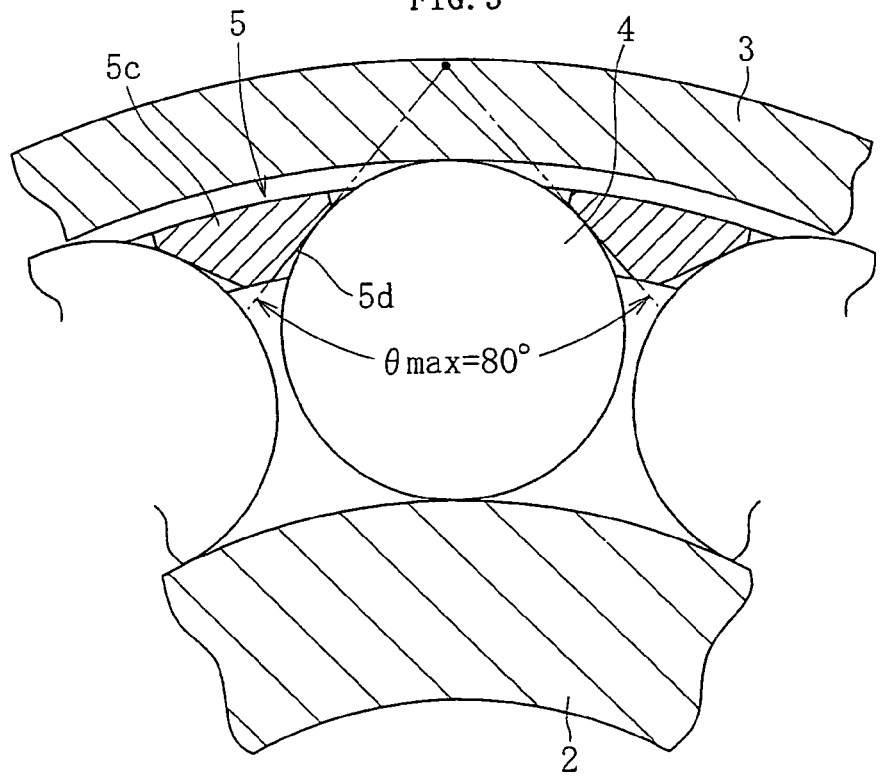
FIG. 3 is a partially enlarged sectional view showing the tapered roller bearing having a maximum window angle.
Figure 7:
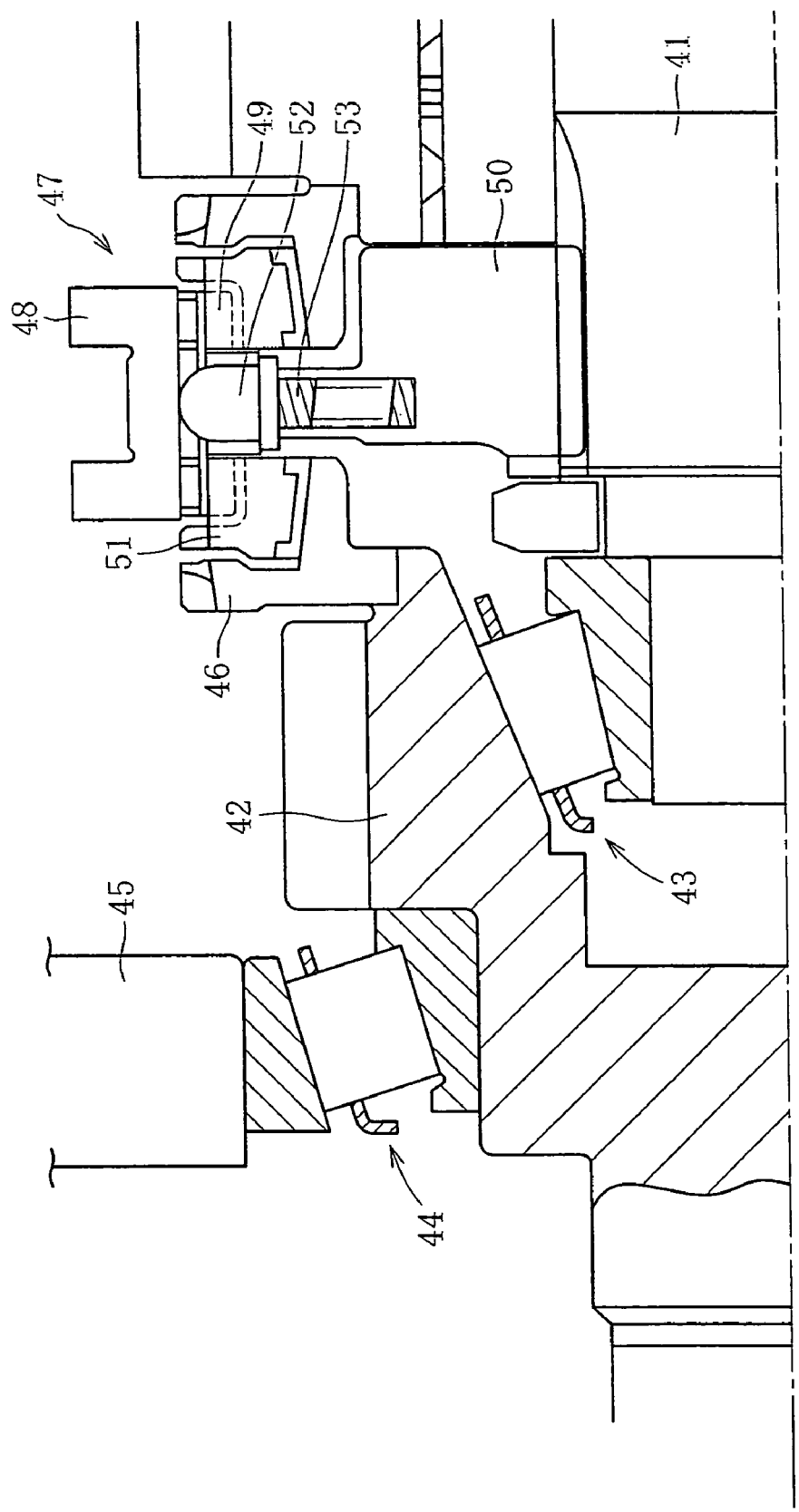
FIG. 7 is a sectional view showing a general automobile transmission.
Figure 8:
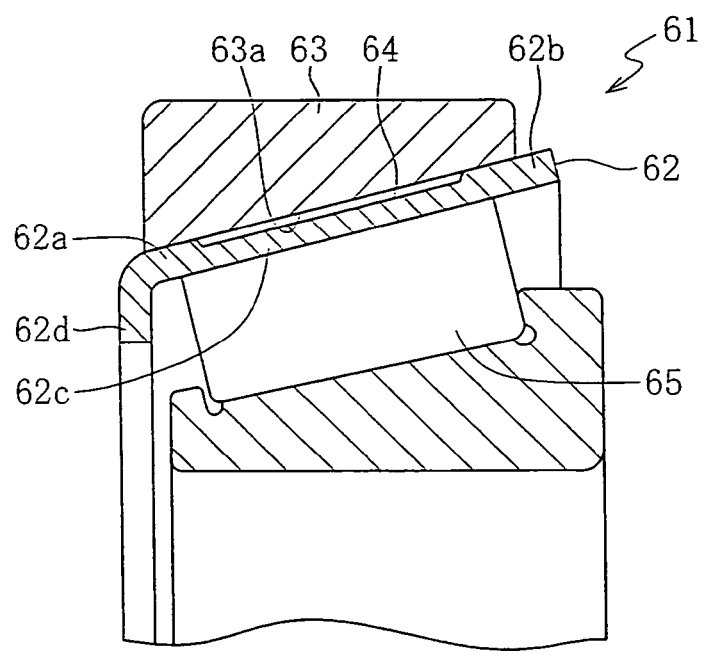
FIG. 8 is a sectional view showing a conventional tapered roller bearing with the cage shifted to the outer ring.
Figure 9:
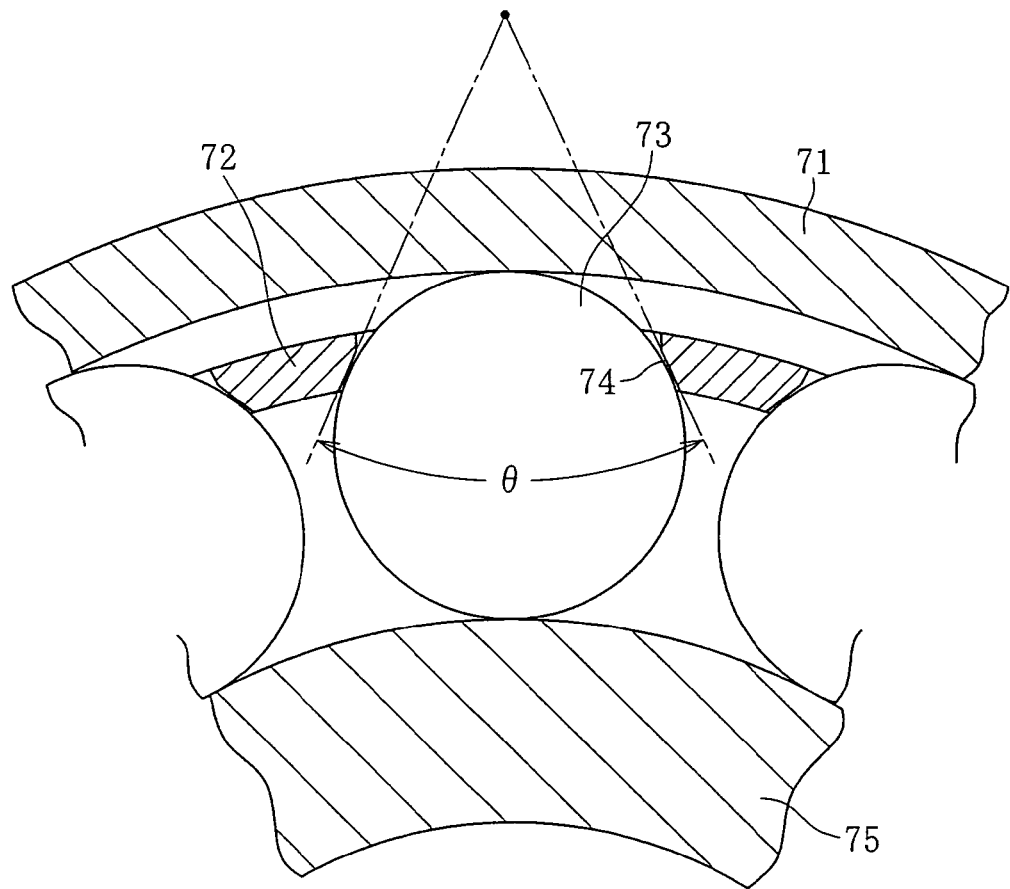
FIG. 9 is a partially enlarged sectional view showing another conventional tapered roller bearing.

The minimum window angle θmin of the window angle θ of pole surfaces 5d is 55° as shown in FIG. 2, and the maximum window angle θmax thereof is 80° as shown in FIG. 3. The window angle in the typical tapered roller bearing with a cage that is spaced from the outer ring as shown in FIG. 9 is approximately 50° at most. The reason for setting the minimum window angle θmin at 55° is to secure a proper state of contact with the roller. If the window angle is less than 55°, the state of contact with the roller becomes improper. That is, in the case that the window angle is 55° or more, γ can be made greater than 0.94, and a proper state of contact can be ensured while the strength of the cage is ensured. Furthermore, the reason for setting the maximum window angle θmax at 80° is that if it is larger than this value, the pressing force in the radial direction increases, and there is a danger that smooth rotation cannot be obtained even if the cage is made of a self-lubricating resin material.

FIG. 4 shows the results of bearing life tests. In FIG. 4 "Comparative example 1" in the "Bearing" column is a typical conventional tapered roller bearing with a cage that is spaced from the outer ring. "Embodiment 1" is a tapered roller bearing according to the present invention, the roller coefficient γ of which is greater than 0.94, being different from the conventional bearing only in this respect. "Embodiment 2" is another tapered roller bearing according to the present invention, the roller coefficient γ of which is greater than 0.94, and the window angle of which is set in the range of 55° to 80°. The tests were conducted under severe lubrication and excessive load conditions. As clarified in the figure, the life of "Embodiment 1" is more than twice the life of "Comparative example 1." Furthermore, the life of "Embodiment 2" is approximately five or more times the life of "Embodiment 1" although the roller coefficient thereof is the same (0.96) as that of "Embodiment 1." "Comparative example 1", "Embodiment 1" and "Embodiment 2" measure 45 (inner diameter)×81 (outer diameter)×16 overall width (unit: mm), the number of the rollers in "Comparative example 1" is 24, the number of the rollers in "Embodiment 1" and "Embodiment 2" is 27, and oil film parameter Λ is 0.2.

Next, a modified embodiment according to the present invention will be described referring to FIGS. 5 and 6. In the tapered roller bearing 1 shown in the figures, protruding sections 5f having a convex shape protruding to the outer ring raceway surface are formed on the outer diameter surfaces of the pole sections 5c of the cage 5 that is integrally molded of an engineering plastic. In other respects, the cage 5 is the same as that described above. The contour of the protruding section 5f, in the cross-sectional direction of the pole section 5c, is arc-shaped as shown in FIG. 6. The curvature radius $R_2$ of this arc shape is made smaller than the radius $R_1$ of the outer ring raceway surface. The shape is determined so that a proper wedge-shaped oil film is formed between the protruding section 5f and the outer ring raceway surface, and it is desirable that the curvature radius $R_2$ of the protruding section should be approximately 70 to 90% of the radius $R_1$ of the outer ring raceway surface. If the curvature radius is less than 70%, the inlet opening angle of the wedge-shaped oil film becomes so large that the dynamic pressure decreases. Furthermore, if it is more than 90%, the inlet angle of the wedge-shaped oil film becomes so small that the dynamic pressure also decreases. In addition, the width $W_2$ of the protruding section 5f is desirably 50% or more of the width $W_1$ or the pole section 5c ($W_2 \geq 0.5 \times W_1$). The reason is that if the width is less than 50%, the height of the protruding section 5f for forming a proper wedge-shaped oil film cannot be secured sufficiently. In addition, because the radius $R_1$ of the outer ring raceway surface continuously changes from the large diameter side to the small diameter side, the curvature radius $R_2$ of the protruding section 5f is also changed continuously from the large curvature radius $R_2$ of the large diameter side annular section 5b to the small curvature radius $R_2$ of the small diameter side annular section 5a accordingly in a similar way.

Because the tapered roller bearing 1 shown in FIGS. 5 and 6 is configured as described above, when the bearing 1 rotates and the cage 5 starts to rotate, a wedge-shaped oil film is formed between the outer ring raceway surface and the protruding section 5f of the cage 5. This wedge-shaped oil film produces dynamic pressure substantially proportional to the rotation speed of the bearing 1. Therefore, even if the pitch circle diameter (PCD) of the cage 5 is made larger than the conventional value so as to dispose the cage close to the outer ring raceway surface, the bearing 1 can be rotated without causing much abrasion or torque loss. Hence, the number of the rollers can be increased without trouble.

Although the embodiments according to the present invention have been described above, the present invention is not limited to the above-mentioned embodiments but can be modified variously. For example, although a super engineering plastic, such as PPS, PEEK, PA, PPA or PAI, is used as the material of the cage in the above-mentioned embodiments, it may be possible that glass fiber, carbon fiber or the like is mixed with such a resin material or other engineering plastics as necessary to increase the strength.

INDUSTRIAL APPLICABILITY

The tapered roller bearing 1 according to the present invention can be incorporated into automobile transmissions, and can also be used for automobile differential gears and automobile gear devices, and for other applications.

The invention claimed is:

1. A tapered roller bearing comprising:
   an inner ring;
   an outer ring;
   multiple tapered rollers rollably disposed between said inner and outer rings; and
   a cage for holding said tapered rollers at predetermined circumferential intervals, wherein a roller coefficient γ thereof is larger than 0.94,
   wherein said cage includes pockets for holding said tapered rollers, respectively, and a window angle of each of said pockets is in a range of 55° to 80°, and
   wherein said cage includes pole sections extending between adjacent ones of said pockets, respectively, each of said pole sections including a protruding section having a convex shape protruding toward said outer ring for forming a wedge-shaped oil film between said protruding section and a raceway surface of said outer ring.

2. The tapered roller bearing according to claim 1, wherein a radius of curvature of each of said protruding sections is 70 to 90% of a radius of curvature of an inner surface of said outer ring, as viewed in an axial direction of the tapered roller bearing.

3. The tapered roller bearing according to claim 1, wherein said cage is formed of an engineering plastic.

4. A tapered roller bearing comprising:
   an inner ring;
   an outer ring;
   multiple tapered rollers rollably disposed between said inner and outer rings; and a cage for holding said tapered rollers at predetermined circumferential intervals, wherein a roller coefficient γ thereof is larger than 0.94,
   wherein said cage includes pockets for holding said tapered rollers, respectively, and wherein said cage includes pole sections extending between adjacent ones of said pockets, respectively, each of said pole sections including a protruding section having a convex shape protruding toward said outer ring for forming a wedge-shaped oil film between said protruding section and a raceway surface of said outer ring.

5. The tapered roller bearing according to claim 4, wherein a radius of curvature of each of said protruding sections is 70 to 90% of a radius of curvature of an inner surface of said outer ring, as viewed in an axial direction of the tapered roller bearing.

6. The tapered roller bearing according to claim 4, wherein said cage is formed of an engineering plastic.

* * * * *